United States Patent
Hickman et al.

(10) Patent No.: US 11,762,652 B2
(45) Date of Patent: *Sep. 19, 2023

(54) SYSTEMS AND METHODS FOR COORDINATING THE DEPLOYMENT OF COMPONENTS TO DEFINED USER GROUPS

(71) Applicant: Palantir Technologies Inc., Denver, CO (US)

(72) Inventors: William Hickman, Brooklyn, NY (US); Mark Elliot, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/880,362

(22) Filed: Aug. 3, 2022

(65) Prior Publication Data
US 2022/0374225 A1  Nov. 24, 2022

Related U.S. Application Data

(63) Continuation of application No. 17/349,439, filed on Jun. 16, 2021, now Pat. No. 11,442,719, which is a
(Continued)

(51) Int. Cl.
*G06F 9/44* (2018.01)
*G06F 8/65* (2018.01)
*G06F 9/451* (2018.01)

(52) U.S. Cl.
CPC ............... *G06F 8/65* (2013.01); *G06F 9/451* (2018.02)

(58) Field of Classification Search
CPC ....................................................... G06F 8/65
(Continued)

(56) References Cited

U.S. PATENT DOCUMENTS 6,047,129 A  4/2000  Frye
6,141,003 A  10/2000  Chor et al.
(Continued)

FOREIGN PATENT DOCUMENTS

CN    114237810 A  *  3/2022
CN    114756229 A  *  7/2022
WO    WO-2020091592 A1 *  5/2020

OTHER PUBLICATIONS

Notice of Allowance for U.S. Appl. No. 15/423,380 dated Jun. 3, 2019.
(Continued)

*Primary Examiner* — Francisco J Aponte
(74) *Attorney, Agent, or Firm* — Sheppard Mullin Richter & Hampton LLP

(57) ABSTRACT

Systems and methods are provided for coordinating the deployment of frontend assets to defined user groups. Individual groups of users may be assigned to a track comprising a set of frontend assets. Each set of frontend assets may comprise each of the individual components required to generate an entire frontend for an application. In some embodiments, different versions of a single component may be assigned within different tracks. As such, one set of users may be provided a first version of an application and a second set of users may be provided a second version of that application. By associating a new or updated version of a component to a given track, a new or updated version of a component not yet ready for widespread deployment may be provided to only a limited number of users.

18 Claims, 5 Drawing Sheets

Related U.S. Application Data continuation of application No. 16/730,911, filed on Dec. 30, 2019, now Pat. No. 11,042,367, which is a continuation of application No. 16/365,411, filed on Mar. 26, 2019, now Pat. No. 10,521,220.

(60) Provisional application No. 62/781,419, filed on Dec. 18, 2018.

(58) Field of Classification Search
USPC ......................................................... 717/169
See application file for complete search history.

(56) References Cited

U.S. PATENT DOCUMENTS

| | | | |
|---|---|---|---|
| 6,282,709 | B1 | 8/2001 | Reha |
| 6,477,703 | B1 | 11/2002 | Smith et al. |
| 6,552,739 | B1 | 4/2003 | Reed |
| 6,836,773 | B2 | 12/2004 | Tamayo et al. |
| 6,854,107 | B2 | 2/2005 | Green |
| 6,938,250 | B2 | 8/2005 | Cohen et al. |
| 7,216,088 | B1 | 5/2007 | Chappel et al. |
| 7,322,025 | B2 | 1/2008 | Reddy |
| 7,389,504 | B2 | 6/2008 | Kawano et al. |
| 7,594,225 | B2 | 9/2009 | Barr et al. |
| 7,685,591 | B2 | 3/2010 | Barr et al. |
| 7,685,596 | B1 * | 3/2010 | Webb ....................... G06F 8/61 717/172 |
| 8,108,855 | B2 | 1/2012 | Dias |
| 8,316,344 | B2 * | 11/2012 | Kaetker ..................... G06F 8/10 717/106 |
| 8,341,619 | B2 | 12/2012 | Pall |
| 8,370,802 | B2 | 2/2013 | Pacifici |
| 8,782,634 | B2 | 7/2014 | Ushiku |
| 8,799,890 | B2 | 8/2014 | Vidal |
| 8,880,477 | B2 | 11/2014 | Barker et al. |
| 8,910,142 | B2 * | 12/2014 | Valeriano ................... G06F 8/65 717/172 |
| 8,918,775 | B1 | 12/2014 | Carpenter |
| 9,043,752 | B2 | 5/2015 | Bagher |
| 9,098,375 | B2 * | 8/2015 | Narkinsky .............. G06F 8/658 |
| 9,148,465 | B2 | 9/2015 | Gambardella |
| 9,195,696 | B2 | 11/2015 | Smith et al. |
| 9,235,402 | B2 | 1/2016 | Carpenter |
| 9,256,761 | B1 | 2/2016 | Sahu et al. |
| 9,268,552 | B1 | 2/2016 | Kiiskila |
| 9,292,261 | B1 | 3/2016 | Bouldin |
| 9,329,838 | B2 | 5/2016 | Tattrie |
| 9,633,406 | B2 | 4/2017 | Bala et al. |
| 9,720,991 | B2 | 8/2017 | Kritchko et al. |
| 9,805,071 | B1 | 10/2017 | Ellis et al. |
| 9,870,211 | B2 | 1/2018 | Risbood et al. |
| 10,114,953 | B2 | 10/2018 | Lu |
| 10,353,699 | B1 * | 7/2019 | Yu ........................ G06F 16/2358 |
| 10,409,786 | B2 | 9/2019 | Mowatt et al. |
| 10,620,935 | B2 * | 4/2020 | Bartolotta ................. G06F 8/41 |
| 10,656,930 | B2 * | 5/2020 | Mansukhani .......... G06N 20/00 |
| 10,754,638 | B1 | 8/2020 | Dwivedi et al. |
| 10,754,822 | B1 | 8/2020 | Patil |
| 10,831,462 | B2 * | 11/2020 | Hofhansl .................. G06F 8/65 |
| 10,972,538 | B2 * | 4/2021 | Chen .................. H04L 67/1095 |
| 11,018,931 | B2 | 5/2021 | Stillman et al. |
| 11,226,940 | B2 | 1/2022 | Ande et al. |
| 2002/0129004 | A1 | 9/2002 | Bassett et al. |
| 2003/0014479 | A1 | 1/2003 | Shafran et al. |
| 2003/0069696 | A1 | 4/2003 | McGeorge et al. |
| 2003/0074256 | A1 | 4/2003 | Lacroix |
| 2004/0205656 | A1 | 10/2004 | Reulien et al. |
| 2005/0289109 | A1 | 12/2005 | Arrouye et al. |
| 2006/0031813 | A1 | 2/2006 | Bishop et al. |
| 2006/0229931 | A1 | 10/2006 | Fligler et al. |
| 2006/0248162 | A1 | 11/2006 | Kawasaki |
| 2007/0016638 | A1 | 1/2007 | Elbury |
| 2007/0047439 | A1 | 3/2007 | An et al. |
| 2007/0050589 | A1 | 3/2007 | Tanaka et al. |
| 2007/0094256 | A1 | 4/2007 | Hite et al. |
| 2007/0168919 | A1 | 7/2007 | Henseler |
| 2007/0169079 | A1 | 7/2007 | Keller |
| 2007/0169081 | A1 | 7/2007 | Zhao |
| 2007/0180381 | A1 | 8/2007 | Rice et al. |
| 2008/0033919 | A1 | 2/2008 | Arrouye et al. |
| 2008/0091808 | A1 | 4/2008 | Mei et al. |
| 2008/0147354 | A1 | 6/2008 | Rowan et al. |
| 2008/0288935 | A1 | 11/2008 | Kawaguchi |
| 2008/0301670 | A1 | 12/2008 | Gouge et al. |
| 2008/0313175 | A1 | 12/2008 | Kersten et al. |
| 2009/0007088 | A1 | 1/2009 | Fischer et al. |
| 2009/0119638 | A1 | 5/2009 | Li et al. |
| 2009/0287718 | A1 | 11/2009 | Motoyama et al. |
| 2010/0058294 | A1 | 3/2010 | Best et al. |
| 2010/0131084 | A1 | 5/2010 | Van Camp |
| 2011/0087989 | A1 | 4/2011 | McCann et al. |
| 2012/0054057 | A1 | 3/2012 | O'Connell et al. |
| 2012/0124547 | A1 | 5/2012 | Halbedel |
| 2012/0131441 | A1 | 5/2012 | Jitkoff et al. |
| 2012/0266155 | A1 | 10/2012 | Valeriano et al. |
| 2013/0055155 | A1 | 2/2013 | Wong |
| 2013/0124410 | A1 | 5/2013 | Kay et al. |
| 2013/0311423 | A1 | 11/2013 | Price et al. |
| 2014/0059056 | A1 | 2/2014 | Chaney et al. |
| 2014/0149591 | A1 | 5/2014 | Bhattacharya et al. |
| 2014/0282370 | A1 | 9/2014 | Schaefer et al. |
| 2014/0310493 | A1 | 10/2014 | Pace |
| 2014/0324942 | A1 * | 10/2014 | Kessler ................... H04L 67/34 709/203 |
| 2015/0052596 | A1 | 2/2015 | Ayanam |
| 2015/0074053 | A1 | 3/2015 | Sarferaz |
| 2015/0074639 | A1 | 3/2015 | Sanghvi et al. |
| 2015/0074819 | A1 | 3/2015 | Borenstein |
| 2015/0178014 | A1 | 6/2015 | Nelson |
| 2015/0213082 | A1 | 7/2015 | Frankel et al. |
| 2015/0317361 | A1 | 11/2015 | Battaglia et al. |
| 2016/0063050 | A1 | 3/2016 | Schoen et al. |
| 2016/0170802 | A1 | 6/2016 | Belhekar et al. |
| 2016/0182605 | A1 * | 6/2016 | Wong ..................... H04L 67/34 709/203 |
| 2017/0093913 | A1 | 3/2017 | Summers et al. |
| 2017/0141968 | A1 | 5/2017 | Lloyd et al. |
| 2017/0308568 | A1 | 10/2017 | Laethem et al. |
| 2017/0366621 | A1 | 12/2017 | Sagar et al. |
| 2018/0018154 | A1 | 1/2018 | Bums et al. |
| 2018/0084086 | A1 | 3/2018 | Newman et al. |
| 2018/0129654 | A1 | 5/2018 | Ellis et al. |
| 2018/0137113 | A1 | 5/2018 | Kurz et al. |
| 2018/0189055 | A1 | 7/2018 | Dasgupta |
| 2018/0225017 | A1 | 8/2018 | Lalzina |
| 2018/0225288 | A1 | 8/2018 | Shivam et al. |
| 2018/0302303 | A1 | 10/2018 | Skovron et al. |
| 2018/0307525 | A1 | 10/2018 | Gates et al. |
| 2018/0316685 | A1 | 11/2018 | Eberlein et al. |
| 2019/0065158 | A1 | 2/2019 | Varadarajan |
| 2019/0065159 | A1 | 2/2019 | Varadarajan |
| 2019/0205111 | A1 * | 7/2019 | Bennet ...................... G06F 8/65 |

OTHER PUBLICATIONS

Official Communication for U.S. Appl. No. 15/459,836 dated Apr. 10, 2018.

Official Communication for U.S. Appl. No. 15/459,836 dated Jun. 26, 2017.

Notice of Allowance for U.S. Appl. No. 15/474,713 dated Jun. 29, 2017.

Official Communication for U.S. Appl. No. 16/269,133 dated Apr. 5, 2019.

Official Communication for U.S. Appl. No. 15/459,836 dated Dec. 20, 2017.

Official Communication for U.S. Appl. No. 15/459,836 dated May 5, 2017.

Notice of Allowance for U.S. Appl. No. 15/720,766 dated Jun. 12, 2019.

Koivunen et al., "Towards Profiling Program Instances in Host-Based Intrusion Detection Systems by Recognizing Software Update Patterns"; SIN '18, Sep. 10-12, 2018, Cardiff, United Kingdom.

(56) References Cited

OTHER PUBLICATIONS

Dfficial Communication for U.S. Appl. No. 15/479,395 dated Feb. 28, 2019.

* cited by examiner

SYSTEMS AND METHODS FOR COORDINATING THE DEPLOYMENT OF COMPONENTS TO DEFINED USER GROUPS

CROSS REFERENCE TO RELATED APPLICATIONS

This application is a continuation of U.S. application Ser. No. 17/349,439, filed Jun. 16, 2021, which is a continuation of U.S. application Ser. No. 16/730,911, filed Dec. 30, 2019, now U.S. Pat. No. 11,042,367, which is a continuation of U.S. application Ser. No. 16/365,411, filed Mar. 26, 2019, now U.S. Pat. No. 10,521,220, which claims the benefit under 35 U.S.C. § 119(e) of U.S. Provisional Application No. 62/781,419, filed Dec. 18, 2018, the content of each of which is incorporated by reference in their entirety into the present disclosure.

TECHNICAL FIELD

This disclosure relates to approaches for coordinating the deployment of electronic assets to individual users.

BACKGROUND

Under conventional approaches, deploying and testing new or updated versions of computer applications and/or their individual components may be difficult. For example, in order to test a new or updated version of a computer application (or even just a single component), the entire new or updated application may need to be deployed to one or more users of a system. If one or more issues are identified with the new or updated version, the new or updated version may need to be modified and once again deployed to each of the one or more users that were originally provided with the new or updated version, in addition to any users who have not yet received the new or updated version. This process can be computationally expensive, cumbersome, and/or time-consuming. These and other drawbacks exist with conventional solutions.

SUMMARY

Various embodiments of the present disclosure may include systems, methods, and non-transitory computer readable media configured to coordinate the deployment of frontend assets to defined user groups. Individual groups of users may be assigned to a track comprising a set of frontend assets. For example, a set of frontend assets may comprise each of the individual components required to generate a given user interface for an application. In some embodiments, different versions of a single component may be assigned within different tracks. As such, one set of users may be provided a first version of an application and a second set of users may be provided a second version of that application. By associating a new or updated version of a component to a given track, a new or updated version of a component not yet ready for widespread deployment may be provided to only a limited number of users (e.g., such as only developers and/or administrative users). For example, in some embodiments, individual components may be assigned to different tracks and/or provided to specific groups of users based on their confidence/stability level. Tracks are easily configurable and enable individual components to be deployed and tested without requiring the development of a separate stack.

In various embodiments, the systems, methods, and non-transitory computer readable media are configured to manage application components to be deployed to users. An application component may comprise any frontend asset that may be treated as a static file. For example, an application component may comprise a user interface component, a library, and/or other application, program, or file provided to a user that may be treated as a static file. In various embodiments, different versions of a single frontend asset may comprise separate application components. For example, one application component may comprise a first version of an application, and a second application component may comprise a second version of the same application. In association with each individual application component, information related to that application component may be stored. For example, the information related to that application component may comprise metadata for that application component.

In various embodiments, the systems, methods, and non-transitory computer readable media are configured to facilitate the creation of tracks. A track may comprise the stack of application components (or frontend assets) that are deployed to individual users. In various implementations, each track must include all application components required to render a full frontend. In some implementations, when deployed, a separate user interface may be constructed and provided for each separate track. Each track may be associated with one or more users. In various embodiments, application components to associate with a track may be identified based on parameters characterizing the application components to associate with the track. For example, a parameter may comprise a confidence level or a stability level of application components to be associated with a track.

In various embodiments, the systems, methods, and non-transitory computer readable media are configured to identify a user, determine a track associated with the user, and cause application components to be deployed to the user based on the determined track. For example, information defining a track may be used to generate a user interface comprising the set of application components associated with the determined track. Different interfaces may be generated for different users based on the tracks associated with those users. As new application components are received and/or the information related to stored application components changes, the set of application components associated with the track may be updated and the deployment of the track may be modified accordingly. In various embodiments, an entire frontend may be generated for each track. In some embodiments, a user presented with a first frontend generated based on one track will have no knowledge of any other frontends generated based on other tracks, the difference between the first frontend and the other frontends, or other application components not included in the first frontend.

These and other features of the systems, methods, and non-transitory computer readable media are disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention(s).

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention(s) are utilized, and the accompanying drawings of which:

DETAILED DESCRIPTION

A claimed solution rooted in computer technology overcomes problems specifically arising in the realm of computer technology. It will be appreciated by those having skill in the art that the implementations described herein may be practiced without these specific details or with an equivalent arrangement. In other instances, well-known structures and devices are shown in block diagram form to avoid unnecessarily obscuring the implementations.

Figure 1:
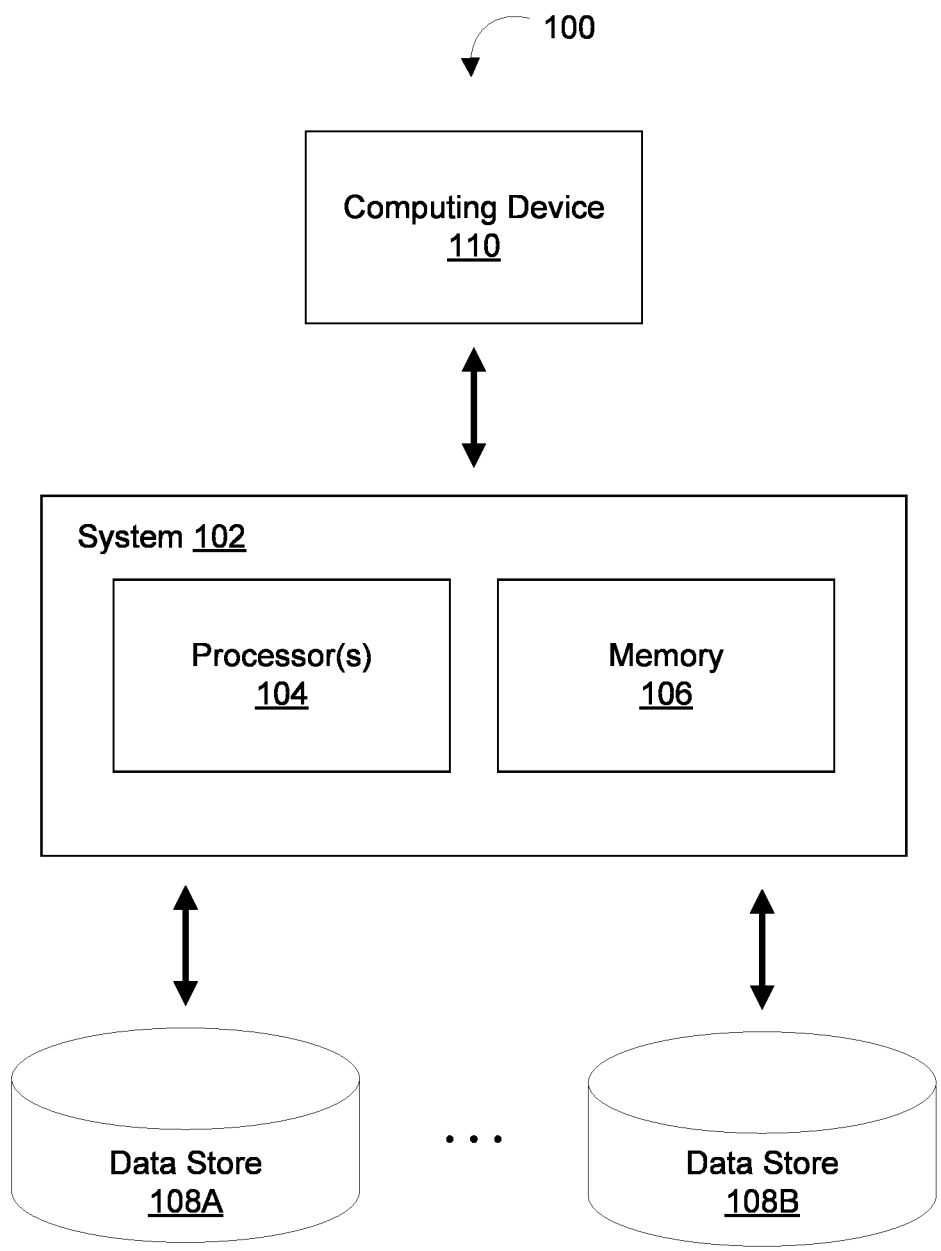
FIG. 1 depicts a diagram of an example of a system for coordinating the deployment of components to defined user groups, in accordance with various embodiments.

FIG. 1 depicts a diagram of an example of an environment 100 for coordinating the deployment of components to defined user groups, in accordance with various embodiments. As shown in FIG. 1, the example environment 100 can include at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. For example, memory 106 may store instructions for asset deployment engine 200 that, when executed by the one or more processors 104, cause the one or more processors 104 to perform various operations described with respect to FIG. 2. The environment 100 may also include a computing device 110 that is able to communicate with the system 102 (e.g., over one or more computer networks) and a data store 108 that is accessible to the system 102.

In some embodiments, the system 102 and the computing device 110 may be integrated in a single device or system. Alternatively, the system 102 and the computing device 110 may be individual computing devices. For example, the computing device 110 may be a mobile device and the system 102 may be a computing server. The data store 108 may be accessible to the system 102, for example, through the memory 106, another device coupled to the system 102, cloud-based storage, etc. Various operations that are capable of being performed by the system 102 are described below in reference to FIGS. 2-4.

Figure 2:
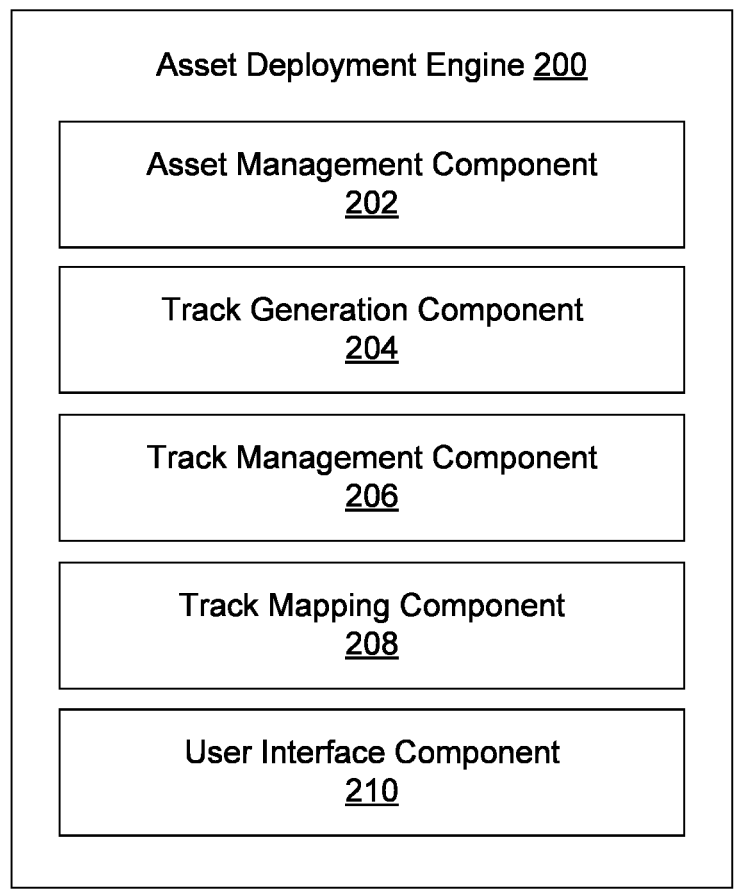
FIG. 2 depicts a diagram of an example of an asset deployment engine, in accordance with various embodiments.

FIG. 2 depicts a diagram of an example of an asset deployment engine 200, in accordance with various embodiments. In various embodiments, functionality of the asset deployment engine 200 may be performed by one or more servers, workstations, desktop computers, laptop computers, mobile devices, and/or other computing devices. In some embodiments, functionality of the asset deployment engine 200 may be performed by computing system 102. For example, the components of asset deployment engine 200 may comprise computer-readable instructions executable by processors 104. The components of asset deployment engine 200 may comprise asset management component 202, track generation component 204, track management component 206, track mapping component 208, user interface component 210, and/or other computer program components. As used herein, for convenience, the various components of asset deployment engine 200 will be described as performing an operation, when, in fact, the various components comprise instructions which may program the processors 104 (and therefore computing system 102) to perform the operation.

Asset management component 202 may be configured to manage application components to be deployed to users. An application component may comprise any frontend asset that may be treated as a static file. For example, an application component may comprise a user interface component, a library, and/or other application, program, or file provided to a user that may be treated as a static file. In some implementations, the application components managed by asset management component 202 may each comprise a frontend asset associated with a single asset server. In various implementations, different versions of a single frontend asset may comprise separate application components. For example, one application component may comprise a first version of an application, and a second application component may comprise a second version of the same application.

In various implementations, asset management component 202 may be configured to store application components to be deployed to users. For example, asset management component 202 may be configured to store application components to be deployed to users in a data store of system 102 (e.g., data store 108). In various implementations, asset management component 202 may be configured to store, in association with each individual application components, information related to that application component. For example, the information related to that application component may comprise metadata for that application component. In various implementations, information related to an application component may identify the application and include indications of a confidence level of the application component, a stability status of the application component, an access level or access control(s) related to the application component, a release date and/or time for the application component, and/or other information related to the application component. In various implementations, information related to an application component may include indications of dependencies between the application component and one or more other application components and/or backend components. For example, information stored by asset management component 202 may comprise a map of the dependencies between individual application components and other application components and/or backend components.

In various implementations, each application component may depend from and/or relate to one or more other application components. For example, in a single user interface, interaction with a single user interface component may prompt one or more actions with respect to one or more other user interface components. In some implementations, each application component may derive or pull information from one or more backend components. As such, each application component may be related in some way to one or more other application components and/or one or more backend components. Information stored by asset management component 202 may include an indication (e.g., a map) of how application components and backend components are interrelated.

In various implementations, each application component may be associated with one or more tracks, as described herein. In some implementations, a single application component may be associated with multiple tracks, wherein for each of the multiple tracks for which the application component is associated, an entirely parallel instance of the application component may be stored. In other words, multiple instances (or copies) of a single application component may be stored and/or maintained by asset management component 202 based on the tracks associated with the application component. For each instance of the application component associated with a given track that is stored, asset management component 202 may be configured to store information indicating the dependencies between that application and one or more application components within that track, as well as the dependencies between that application component and one or more backend components.

Track generation component 204 may be configured to facilitate the creation of tracks. A track may comprise a set of application components to be provided to one or more users. In various implementations, a track may comprise the stack of application components (or frontend assets) that are deployed to individual users. In various implementations, each track must include all application components required to render a full frontend and/or satisfy all asset dependencies for assets within that track. In some implementations, when deployed, a separate user interface may be constructed and provided for each separate track. For example, two separate tracks may comprise entirely different application components, may differ with respect to only one application component, may comprise merely different versions of the same application components, and/or may otherwise differ as may be contemplated based on the features described herein. When deployed, a user interface constructed based on two separate tracks may differ based only on the different application components assigned to the individual tracks. In various implementations, each track may be associated with one or more users. For example, separate tracks may be associated with separate sets of one or more users. Accordingly, each track may be associated with a set of the application components and at least one set of one or more users. Using tracks, the systems and methods described herein may enable different user interfaces to be provided to different sets of users.

In various implementations, track generation component 204 may be configured to generate a track comprising a set of one or more application components. In various implementations, track generation component 204 may be configured to generate a track comprising a set of one or more application components based on user input received. For example, track generation component 204 may be configured to generate a track comprising a set of one or more application components based on input received from a user via a user interface generated by user interface component 210 and provided via a display of a device associated with the user. In various implementations, user input received may comprise an indication of one or more application components to associate with a track, one or more parameters for application components to associate with a track, one or more users to associate with a track, one or more groups of users to associate with a track, one or more characteristics defining users to associate with a track, and/or other information used to generate, deploy, update, and/or maintain a track.

In various implementations, track generation component 204 may be configured to identify application components to associate with a track. In some implementations, track generation component 204 may be configured to identify application components to associate with a track based on user input indicating one or more application components to associate with a track. In some implementations, track generation component 204 may be configured to identify application components to associate with a track based on one or more parameters defining application components to associate with a track. For example, track generation component 204 may be configured to identify application components to associate with a track based on user input received that includes one or more parameters characterizing application components to be associated with a track. A parameter characterizing application components to associate with a track may include a confidence level of application components, a stability level of application components, an access level or access control of an application component, a release date/time associated with an application component, and/or one or more other characteristics of application components to be associated with a track. In various implementations, tracks may be maintained and/or updated based on the parameters characterizing the application components to associate with the track as described herein with respect to track management component 206.

In various implementations, track generation component 204 may be configured to identify application components to associate with a track from a plurality of application components based on information related to the plurality of application components. In some implementations, track generation component 204 may be configured to identify application components to associate with a track from a plurality of application components based on information related to the plurality of application components that includes an identification of a track with which the application component is associated. In some implementations, track generation component 204 may be configured to identify application components to associate with a track from a plurality of application components based on information related to the plurality of application components and the parameters characterizing application components to associate with that track. For example, in various implementations, track generation component 204 may be configured to compare parameters for a given track to information related to a plurality of application components to identify application components to associate with the track.

In an example implementation, a parameter characterizing application components to be associated with a first track may comprise a confidence level. The confidence level may comprise a threshold level of confidence for application components to be associated with the first track. For example, a recently released application component (or version of an application component) may have a lower confidence level than an earlier released application component (or version of that application component). In various implementations, track generation component 204 may be configured to compare information for a plurality of application components indicating a confidence level of each of the application components to the threshold confidence level. Based on the comparison, track generation component 204 may be configured to identify application components to be associated with a track for which the confidence level parameter applies.

In various implementations, track generation component 204 may be configured to associate application components with a track. In some implementations, track generation component 204 may be configured to cause an application component of a plurality of application component that was identified based on information related to the plurality of application components to be associated with a track. For example, application components may be associated with a track based on user input indicating an application component should be associated with a track and/or based on a comparison of information related to the application component and a parameter associated with the track. In some implementations, track generation component 204 may be configured to cause information defining the track to be stored in a data store of system 102 (e.g., data store 108). For example, the information defining the track may include an indication of the one or more application components associated with the track. In some implementations, the information defining the track may include an indication of how the application components associated with the track are related.

In various implementations, track generation component 204 may be configured to associate a track with one or more users. For example, a given track may be associated with one or more individual users, a predefined group of users, and/or other defined sets of one or more users. In an example implementation, separate tracks may be associated with separate groups of users within an organization. For example, an organization may include developers, administrators, and end-users. The developers may include individuals working on creating and updating application components to be deployed. The administrators may include individuals that review application components before they are deployed. The end-users may comprise the individuals for which the application components are designed—i.e., the users for whom the application components may actually be intended. In the foregoing example implementation, the different tracks may be associated with the separate groups of users based on the separate group of users' role in the deployment of application components to individuals in the organization. In various implementations, track generation component 204 may be configured to associate a track with one or more users based on input received from a user via a user interface generated by user interface component 210 and provided via a display of a device associated with the user. For example, user input may include an indication that a single user is to be associated with a given track, that users with one or more common characteristics are to be associated with a given track, that a predefined group of users is to be associated with a given track, and/or other user input defining one or more users to associate with a track. In various implementations, track generation component 204 may be configured to store indications of one or more users associated with each track. For example, information defining a track may include an indication of the one or more users associated with the track. In some implementations, track generation component 204 may be configured to store information mapping a plurality of tracks of system 102 to different sets of one or more users.

In various implementations, some or all of the functionality of the track generation component 204, like some or all of the components described herein, may be performed by one or more other components (e.g., track mapping component 208). For example, having a separate component which associates tracks with users may keep the mapping separate from the definition of the track itself. Similarly, a different component (e.g., track mapping component 208) maps users and/or groups to a track. Accordingly, a user and/or group may be mapped to a track which has already been defined separately in the track mapping component 208, which may allow the users and/or groups associated with a track to be changed without the track itself needed to be changed.

Track management component 206 may be configured to maintain and/or modify (e.g., create, read, update, and/or delete) tracks. For example, track management component 206 may be configured to maintain and/or update tracks generated by track generation component 204. In various implementations, track management component 206 may be configured to maintain, update, and/or obtain information defining tracks. In various implementations, track management component 206 may be configured to update tracks based on one or more parameters associated with a track, receipt of a new application component, and/or new or modified information related to one or more application components. In other words, track management component 206 may be configured to ensure tracks comply with defined parameters based on the receipt of new application components and/or as the information related to existing application components changes.

In various implementations, track management component 206 may be configured to maintain and/or update tracks by monitoring stored application components and stored information related to stored application components. In some implementations, track management component 206 may be configured to identify one or more application components to associate with a track generated by track generation component 204. For example, in an implementation in which a given track is associated with a certain stability level, track management component 206 may be configured to identify one or more new application components that meet the stability level for that track. The one or more identified application components may comprise application components different from the application currently associated with the track. In some implementations, track management component 206 may be configured to update a track based on the identification of one or more application components to associate with the track. In some implementations, tracks may be associated with multiple parameters. For example, a single track may be associated with at least one parameter characterizing application components to be associated with the track and at least one other parameters defining a date and/or time at which the track may be updated. Accordingly, a user may not only specify what application components to include in a track based on various aspects of the application components, but may also specify when to update that track based on new application components or changes in information related to the application components. In some implementations, track management component 206 may be configured to receive an indication of a time at which to update the track. For example, user input may be received indicating a time at which to update a track. The user input may be received as further described herein. In some implementations, track management component 206 may be configured to cause the track to be updated to include a different set of application components. For example, a track may initially have a first set of application components. Based on the identification of one or more new or different application components to associate with the track, track management component 206 may be cause the track to be associated with a third set of application components. When updated (i.e., based on the identified date and/or time to update the track), track management component 206 may be configured to cause information defining the updated track to be provided to user interface component 210 to generate a new user interface including the third set of application components.

By creating different tracks for different sets of one or more users, the systems and methods described herein enable the same user interface to be provided to different users but with different application components (or versions of application components) specifically chosen for those particular users. For example, based on the user and the track assigned to that user, the same frontend may be provided but with different versions of application components or with application components having different release characteristics. As such, the systems and methods described herein enable a system to show different versions of the same application component (e.g., at different stability levels) without having to generate multiple entire stacks. In other words, multiple distinct copies of application components and their associated configuration may be served from a single server on a single deployment. Because the application components (which may be treated as static files and thus do not require another CPU and more RAM) each utilize the same backend service, the application components may be tested without the additional complexity and cost of adding those additional backend components. Moreover, the tracks themselves facilitate the seamless deployment of application components to separate groups in a controlled manner.

In some embodiments, embodiments, some or all of the application components within a track must have their dependencies satisfied by one or more other application components within the same track, and/or by backend server components. Accordingly, in some embodiments, application components cannot depend upon and/or interact with components in different tracks.

In an example implementation, the systems and methods described herein may be used to stagger the deployment of new or updated application components to different users within an organization. In some implementations, a parameter characterizing application components to associate with one or more tracks may comprise a confidence level or stability level. For example, one or more tracks may each be associated with a different confidence level or stability level. In an example implementation, one or more tracks created by track generation component 204 may include a STABLE track, a RELEASE track, and a DEVELOPMENT track. Each of the foregoing tracks may be associated with a separate maintenance window. In the foregoing example implementation, the STABLE track may only comprise application components that satisfy a high threshold confidence level, the RELEASE track may comprise application components that satisfy a medium threshold confidence level, and the DEVELOPMENT track may comprise any application components regardless of confidence level (or at least application components below a certain confidence level). Accordingly, each track may comprise application components at different stages of deployment. The DEVELOPMENT track may only be provided to developers or engineers that are designing the application components for eventual release to the end-users. The developers or engineers may be able to utilize the newly developed application components as they would be provided to end users and identify problems before the application components are deployed to all users. Once approved by the developers for release to the next level (or once the confidence level reaches a certain point), a given application component may be deployed with a set of application components as part of the RELEASE track. The RELEASE track may comprise a separate version of the same interface through which application components may be further tested before being deployed to end users (via the STABLE track).

Track mapping component 208 may be configured to determine a track associated with a given user and cause application components to be deployed to the user based on the track associated with the user. For example, track mapping component 208 may be configured to identify a user based on login information, user profile information, and/or other information identifying the user. In various implementations, track mapping components 208 may be configured to obtain information defining tracks of system 102. As described herein, information defining a track may include an indication of the one or more application components associated with the track, an indication of how the application components associated with the track are related, an indication of the one or more users associated with the track, and/or other information related to a given track. Based on the information defining one or more tracks and the identification of the user, track mapping component 208 may be configured to identify a track to be deployed to the user.

In various implementations, a first user and a second user may access system 102, which includes at least a first track and a second track. In various implementations, track mapping component 208 may be configured to determine that users are members of one or more groups of users. For example, track mapping component 208 may be configured to determine that the first user is a member of the first group of users and determine that the second user is a member of the second group of users. In various implementations, track mapping component 208 may be configured to identify tracks associated with individual users. For example, the first track may be associated with a first group of users, and the second track may be associated with a second group of users. Based on the determination that the first user is a member of the first group of users and the second user is a member of the second group of users, track mapping component 208 may be configured to identify the first track as being associated with the first user and identify the second track as being associated with the second user. Based on the identification of the first track as being associated with the first user and the second track as being associated with the second user, track mapping component 208 may be configured to cause information defining the first track and information defining the second track to be provided to user interface component 210.

User interface component 210 may be configured to generate a user interface for a user based on a track associated with the user. For example, user interface component 210 may be configured to generate a user interface for a user based on information defining a track associated with the user. In some implementations, information defining a track associated with the user may include an indication of the set of one or more application components associated with the track. In various implementations, generating a user interface for a user based on the track associated with the user may comprise generating a user interface that includes the set of application components associated with the track. In various implementations, user interface component 210 may be configured to cause a user interface to be provided to a user through a display screen of system 102 and/or computing device 110. In some implementations, the user interface may be provided by a software application running on system 102 and/or computing device 110. In some implementations, user interface component 210 may generate a user interfaces depicted in FIG. 3A and FIG. 3B and cause the user interfaces depicted in FIG. 3A and FIG. 3B to be provided to one or more users.

In various implementations, user interface component 210 may be configured to generate a user interface through which one or more users may generate and/or update tracks comprising a stack of application components (or frontend assets) that are deployed to individual users. For example, the user interface may be configured to receive user input comprising an indication of one or more application components to associate with a track, one or more parameters for application components to associate with a track, one or more users to associate with a track, one or more groups of users to associate with a track, one or more characteristics defining users to associate with a track, and/or other information used to generate, deploy, update, and/or maintain a track. Other user input related to the processes and results described herein may be received via a user interface generated by user interface component 210. For example, in various implementations, user input may comprise textual input provided by a user. For example, the textual input may comprise a keyword, a phrase, a date, a string of numbers, a string of letters, an alphanumeric string, and/or one or more other forms of text-based input.

In various implementations, user interface component 210 may be configured to generate different user interfaces for different users based on the different tracks associated with the different users. For example, track mapping component 208 may be configured to cause information defining a first track associated with a first user and information defining a second track associated with a second user to be provided to user interface component 210 responsive to a determination that the first user is in a first group of users associated with the first track and a determination that the second user is in a second group associated with the second track. Based on the information defining the first track received from track mapping component 208, user interface component 210 may be configured to generate a first user interface that includes a first set of application components associated with the first track and cause the first user interface to be provided to the first user. Based on the information defining the second track received from track mapping component 208, user interface component 210 may be configured to generate a second user interface that includes a second set of application components associated with the second track and cause the second user interface to be provided to the second user.

Figure 3A:
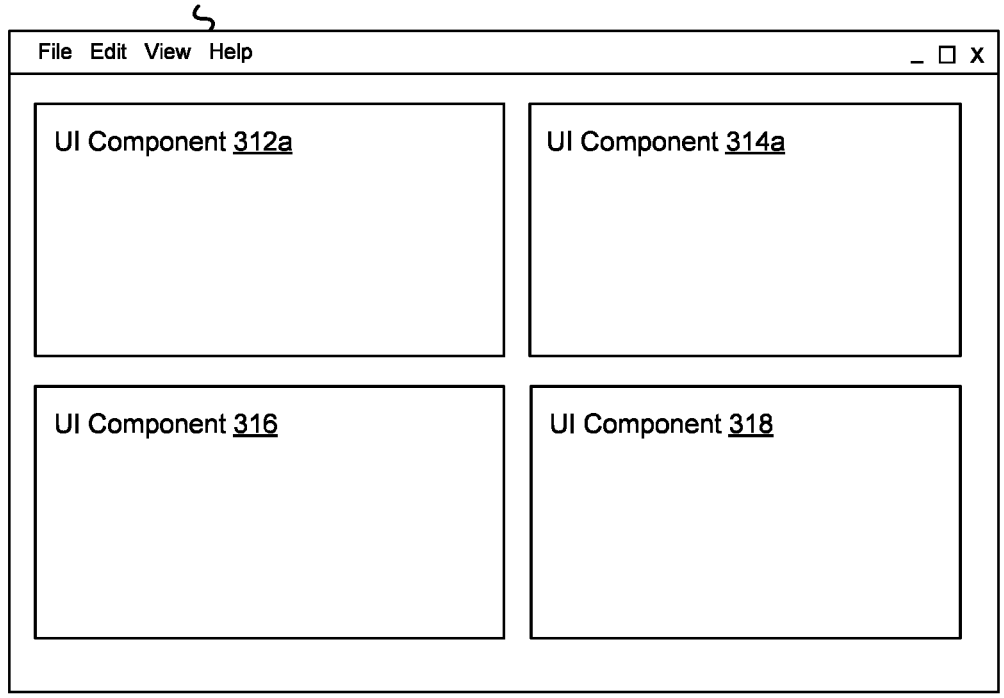
FIG. 3A and FIG. 3B depict an example interface that comprises different components when presented to different users based different tracks being assigned to those users, in accordance with various embodiments.
Figure 3B:
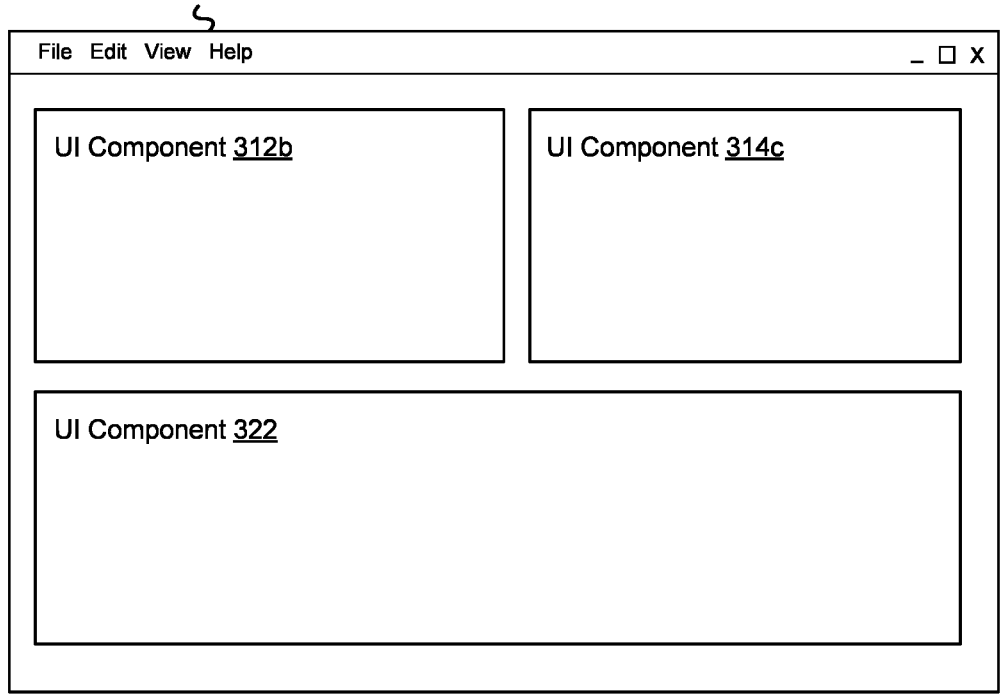

For example, FIG. 3A and FIG. 3B depict an example interface that comprises different components when presented to different users based different tracks being assigned to those users, in accordance with various embodiments. FIG. 3A depicts an example interface 310, and FIG. 3B depicts an example interface 230. Example interface 310 and example 320 may comprise the same interface associated with system 102. However, when presented to different users associated with different tracks, the same user interface may include different application components. Each time a particular interface is presented, it may include a combination of separate application components. For example, the interface may include a combination of UI component 312, UI component 314, UI component 316, UI component 318, UI component 322, and/or one or more other application components. In various implementations, track mapping component 208 may be configured to determine that a first user associated with a first track is accessing a device through which example interface 310 is to be presented, and determine that a second user associated with a second track is accessing a device through which example interface 320 is to be presented. The first track may be associated with a first version of UI component 312, a first version of UI component 314, UI component 316, and UI component 318. The second track may be associated with a second version of UI component 312, a third version of UI component 314, and UI component 322. In various implementations, asset management component 202 may be configured to store separate instances of application components for individual tracks. For example, the stored application components for the first track may comprise at least UI component 312a (which comprises the first version of UI component 312), UI component 314a (which comprises the first version of UI component 314), UI component 316, and UI component 318, and the stored application components for the second track may comprise at least UI component 312b (which comprises the second version of UI component 312), UI component 314c (which comprises the third version of UI component 314), and UI component 322. In some implementations, track mapping component 208 may be configured to identify the first user and determine that the first user is associated with the first track. For example, track mapping component 208 may be configured to determine that the first user is associated with the first track based on a determination that the first is a member of a first group of users that is associated with the first track. Responsive to the determination that the first user is associated with the first track, user interface component 210 may be configured to generate example interface 310 and cause example interface 310 to be provided to the first user through a display screen of system 102 and/or computing device 110. In some implementations, track mapping component 208 may be configured to identify the second user and determine that the second user is associated with the second track. Responsive to the determination that the second user is associated with the second track, user interface component 210 may be configured to generate example interface 320 and cause example interface 320 to be provided to the second user through a display screen of system 102 and/or computing device 110.

In various implementations, an entire frontend may be generated for each track. In various implementations, a user presented with a first frontend generated based on one track will have no knowledge of any other frontends generated based on other tracks, the difference between the first frontend and the other frontends, or other application components not included in the first frontend.

Example Flowcharts of Process

Figure 4:
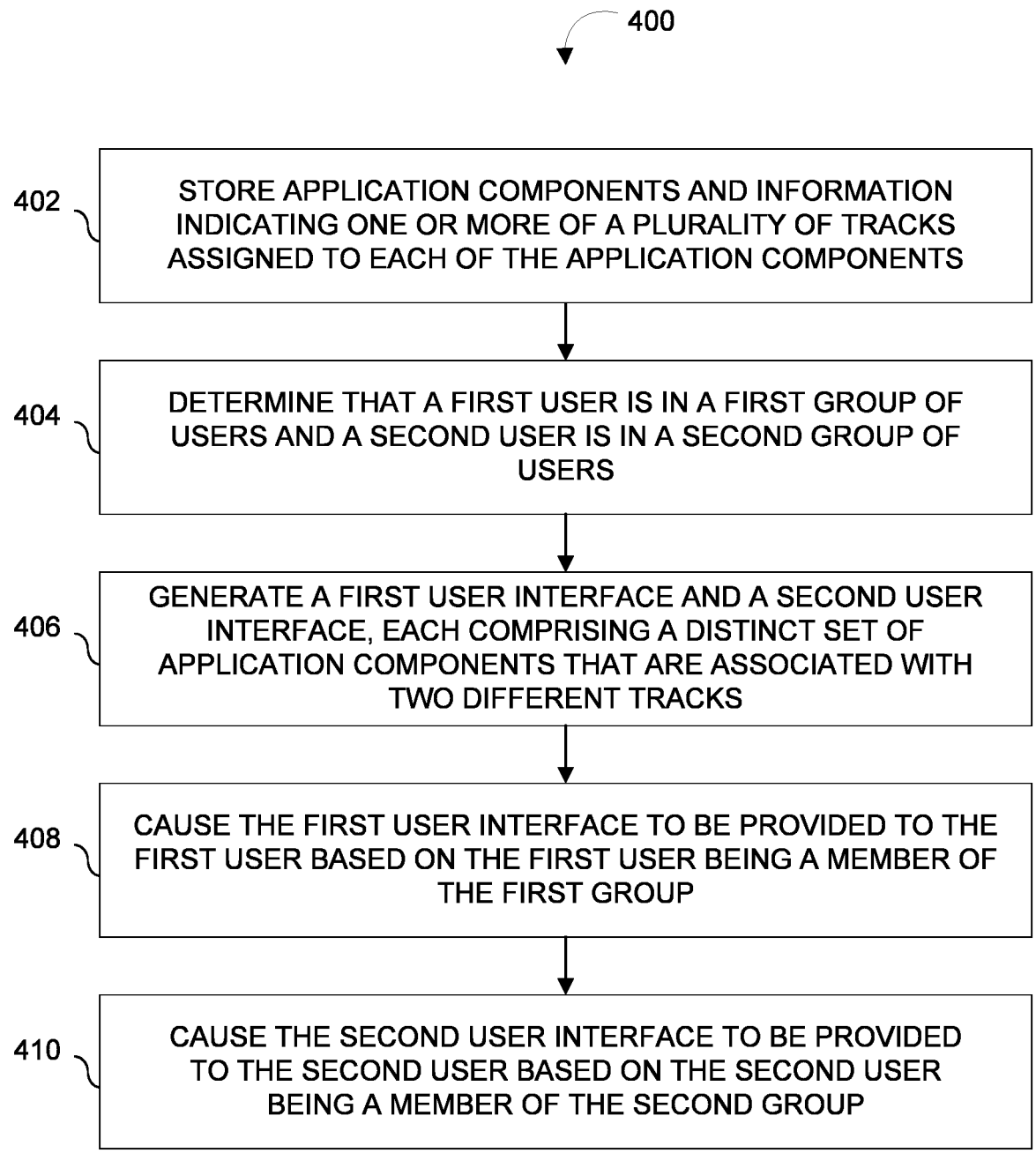
FIG. 4 depicts a flowchart of an example method for coordinating the deployment of components to defined user groups, in accordance with various embodiments

FIG. 4 depicts a flowchart of an example method 400 for coordinating the deployment of components to defined user groups, in accordance with various embodiments. The operations of method 400 presented below are intended to be illustrative and, as such, should not be viewed as limiting. In some implementations, method 400 may be accomplished with one or more additional operations not described, and/or without one or more of the operations discussed. In some implementations, two or more of the operations may occur substantially simultaneously. The described operations may be accomplished using some or all of the system components described herein.

In an operation 402, method 400 may include storing application components and information indicating one or more of a plurality of tracks assigned to each of the application components. An application component may comprise any frontend asset that may be treated as a static file. For example, an application component may comprise a user interface component, a library, and/or other application, program, or file provided to a user that may be treated as a static file. In various implementations, different versions of a single frontend asset may comprise separate application components. For example, one application component may comprise a first version of an application, and a second application component may comprise a second version of the same application. Each track may be associated with a set of application components. In some implementations, the set of application components associated with a track must include each of the application components required to render a full frontend. In various implementations, each track may be generated based on one or more parameters characterizing application components to be associated with a track (and provided to the users associated with that track). For example, generating a first track may include receiving one or more parameters, comparing the one or more parameters with information related to stored application components, identifying the set of application components to be associated with the first track based on the comparison, and causing the identified set of application components to be associated with the first track. In various implementations, parameters characterizing application components to be associated with a track may include a confidence level, a stability level, an access level, a release date, and/or one or more other parameters. In some implementations, tracks may be maintained and/or updated. For example, a track may be maintained and/or updated based on one or more parameters associated with a track, receipt of a new application component, and/or new or modified information related to one or more application components. In some implementations, operation 402 may be performed by a component the same as or similar to asset management component 202, track generation component 204, and/or track management component 206 (shown in FIG. 2 and described herein).

In an operation 404, method 400 may include determining that a first user is in a first group of users and a second user is in a second group of users. In various implementations, each track may be associated with one or more users. For example, separate tracks may be associated with separate groups of users within an organization. In various implementations, a first group of users may be associated with a first track and a second group of users may be associated with a second track. Based on the determination that a first user is a member of a first group of users and a second user is a member of a second group of users, the first track may be identified as associated with the first user and the second track may be identified as associated with the second user. Responsive to the foregoing determination, information defining the first track and information defining the second track may be obtained and provided. In some implementations, operation 404 may be performed by a component the same as or similar to track mapping component 208 (shown in FIG. 2 and described herein).

In an operation 406, method 400 may include generating a first user interface and a second user interface, each comprising a distinct set of application components that are associated with the two different tracks. For example, user interfaces generated for different tracks may be generated based on information defining the different tracks. Information defining a track associated with a user may include an indication of the set of one or more application components associated with the track. In various implementations, generating a user interface for a user based on the track associated with the user may comprise generating a user interface that includes the set of application components associated with the track. In some implementations, operation 406 may be performed by a component the same as or similar to user interface component 210 (shown in FIG. 2 and described herein).

In an operation 408, method 400 may include causing the first user interface to be provided to the first user based on the first user being a member of the first group. In an operation 410, method 400 may include causing the second user interface to be provided to the second user based on the second user being a member of the second group. In various implementations, the first user interface and second user interface may be provided by a software application running on a device associated with the system described herein. In some implementations, operation 408 and operation 410 may be performed by a component the same as or similar to user interface component 210 (shown in FIG. 2 and described herein).

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
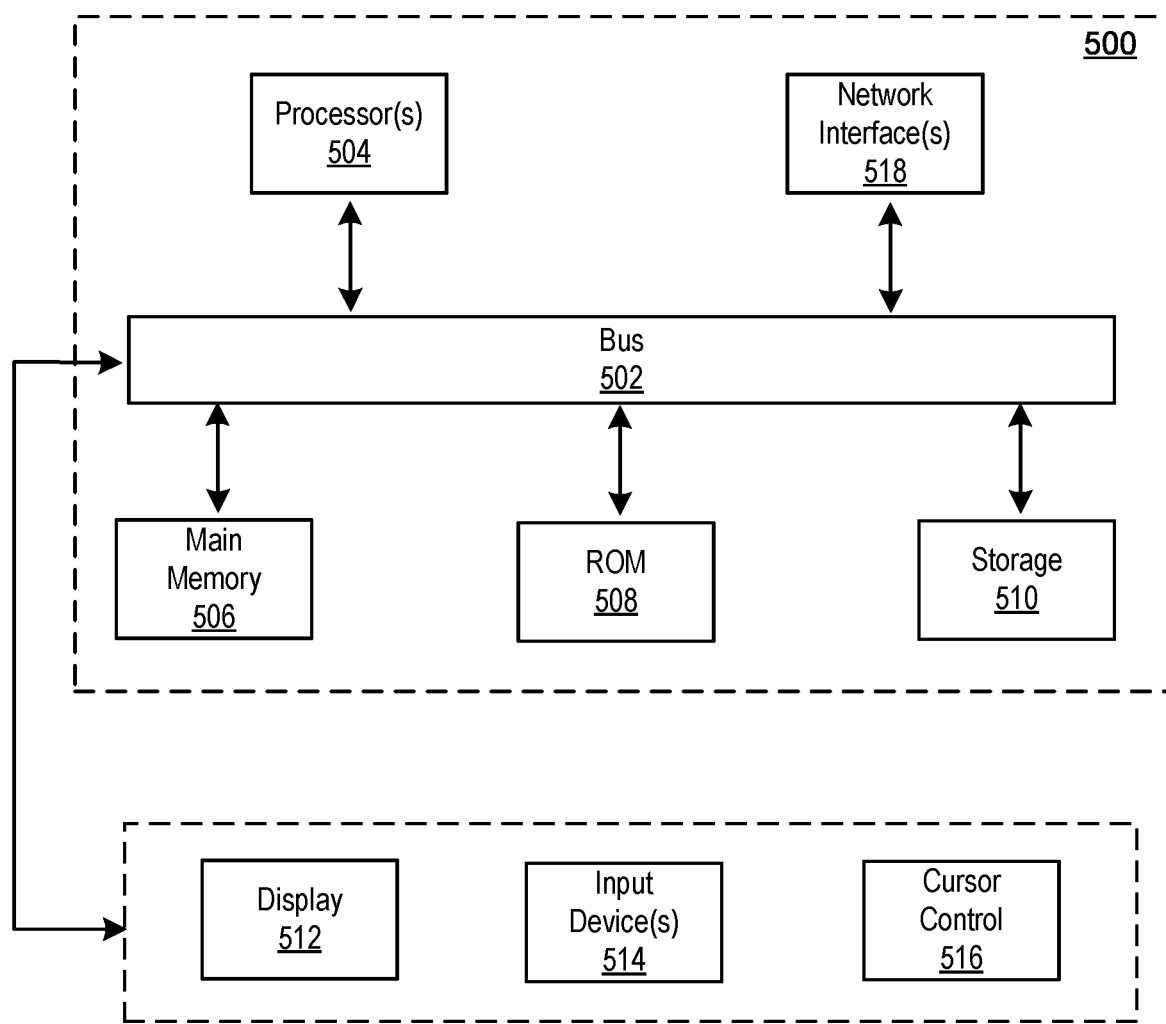
FIG. 5 depicts a block diagram of an example computer system in which any of the embodiments described herein may be implemented.

FIG. 5 depicts a block diagram of an example computer system 500 in which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses, and advantages of the invention will be apparent to those skilled in the art from consideration of the specification and practice of the invention disclosed herein. The specification should be considered to describe examples only, and the scope of the invention is accordingly intended to be limited only by the following claims.

What is claimed is:

1. A system comprising:
one or more processors; and
a memory storing instructions that, when executed by the one or more processors, cause the system to:
generate a first stack or a first stack portion to deploy a first application component;
generate a second stack or a second stack portion to deploy a second application component, wherein the first application component has a first stability level or a first confidence level different from a second stability level or a second confidence level of the second application component;
coordinate a deployment of the first application component based on the first stack or the first stack portion and the second application component based on the second stack or the second stack portion;
receive an indication that a new application component satisfies a dependency corresponding to the first stack or the first stack portion, or the second stack or the second stack portion;
in response to receiving the indication, update the first stack or the first stack portion, or the second stack or the second stack portion based on the new application component, wherein the updating of the first stack or the first stack portion, or the second stack or the second stack portion, is based on the first stability level or the first confidence level, or the second stability level or the second confidence level;
in response to updating the first stack or the first stack portion, or the second stack or the second stack portion, update the deployment of the first application component or the second application component and
separately render a first front end component corresponding to the first application component and a second front end component corresponding to the second application component based on the deployment.

2. The system of claim 1, wherein the instructions further cause the system to:
receive a modification to a first parameter associated with or indicative of the first stability level, or the first confidence level;
modify the first stack or the first stack portion based on the modification to the first parameter; and
render the first front end component based on the modified first stack or the modified first stack portion.

3. The system of claim 1, wherein the rendering of the first front end component is based on derived information from one or more backend components.

4. The system of claim 1, wherein the first application component and the second application component comprise static files.

5. The system of claim 1, wherein the first application component and the second application component each comprise any two selected from a group consisting of: a user interface component, a library, and a program.

6. The system of claim 1, wherein the generating of the first stack is based on a map of dependencies among the application component, a dependent application component, and a backend component.

7. The system of claim 1, wherein the first stability level or the first confidence level is indicative of a different development stage compared to the second stability level or the second confidence level.

8. The system of claim 1, wherein the instructions that, when executed by the one or more processors, cause the system to:
receive an indication of a change in a parameter of the first application component or the second application component, the parameter being indicative of the first stability level, first confidence level, second stability level, or the second confidence level; and
in response to receiving the indication of the change, modify the first stack or the first stack portion, or the second stack or the second stack portion, wherein the modifying comprises:

removing the first application component from the first stack or the first stack portion and replacing the first application component with a new first application component, or removing the second application component from the second stack or the second stack portion and replacing the second application component with a new second application component.

9. A method being implemented by a computing system having one or more processors and a storage media storing machine-readable instructions that, when executed by the one or more processors, cause the computer system to perform the method, the method comprising:
generating a first stack or a first stack portion to deploy a first application component;
generating a second stack or a second stack portion to deploy a second application component, wherein the first application component has a first stability level or a first confidence level different from a second stability level or a second confidence level of the second application component;
coordinating a deployment of the first application component based on the first stack or the first stack portion and the second application component based on the second stack or the second stack portion;
receiving an indication that a new application component satisfies a dependency corresponding to the first stack or the first stack portion, or the second stack or the second stack portion;
in response to receiving the indication, updating the first stack or the first stack portion, or the second stack or the second stack portion based on the new application component, wherein the updating of the first stack or the first stack portion, or the second stack or the second stack portion, is based on the first stability level or the first confidence level, or the second stability level or the second confidence level;
in response to updating the first stack or the first stack portion, or the second stack or the second stack portion, updating the deployment of the first application component or the second application component; and
separately rendering a first front end component corresponding to the first application component and a second front end component corresponding to the second application component based on the deployment.

10. The method of claim 9, further comprising:
receiving a modification to a first parameter associated with or indicative of the first stability level, or the first confidence level;
modifying the first stack or the first stack portion based on the modification to the first parameter; and
rendering the first front end component based on the modified first stack or the modified first stack portion.

11. The method of claim 9, wherein the rendering of the first front end component is based on derived information from one or more backend components.

12. The method of claim 9, wherein the first application component and the second application component comprise static files.

13. The method of claim 9, wherein the first application component and the second application component each comprise any two selected from a group consisting of: a user interface component, a library, and a program.

14. The method of claim 9, wherein the generating of the first stack is based on a map of dependencies among the application component, a dependent application component, and a backend component.

15. The method of claim 9, wherein the first stability level or the first confidence level is indicative of a different development stage compared to the second stability level or the second confidence level.

16. A non-transitory computer readable medium comprising instructions that, when executed, cause one or more processors to perform:
generating a first stack or a first stack portion to deploy a first application component;
generating a second stack or a second stack portion to deploy a second application component, wherein the first application component has a first stability level or a first confidence level different from a second stability level or a second confidence level of the second application component;
coordinating a deployment of the first application component based on the first stack or the first stack portion and the second application component based on the second stack or the second stack portion;
receiving an indication that a new application component satisfies a dependency corresponding to the first stack or the first stack portion, or the second stack or the second stack portion;
in response to receiving the indication, updating the first stack or the first stack portion, or the second stack or the second stack portion based on the new application component, wherein the updating of the first stack or the first stack portion, or the second stack or the second stack portion, is based on the first stability level or the first confidence level, or the second stability level or the second confidence level;
in response to updating the first stack or the first stack portion, or the second stack or the second stack portion, updating the deployment of the first application component or the second application component; and
separately rendering a first front end component corresponding to the first application component and a second front end component corresponding to the second application component based on the deployment.

17. The non-transitory computer readable medium of claim 16, wherein the instructions further cause the one or more processors to perform:
receiving a modification to a first parameter associated with or indicative of the first stability level, or the first confidence level;
modifying the first stack or the first stack portion based on the modification to the first parameter; and
rendering the first front end component based on the modified first stack or the modified first stack portion.

18. The non-transitory computer readable medium of claim 16, wherein the rendering of the first front end component is based on derived information from one or more backend components.

* * * * *